United States Patent Office 3,156,571
Patented Nov. 10, 1964

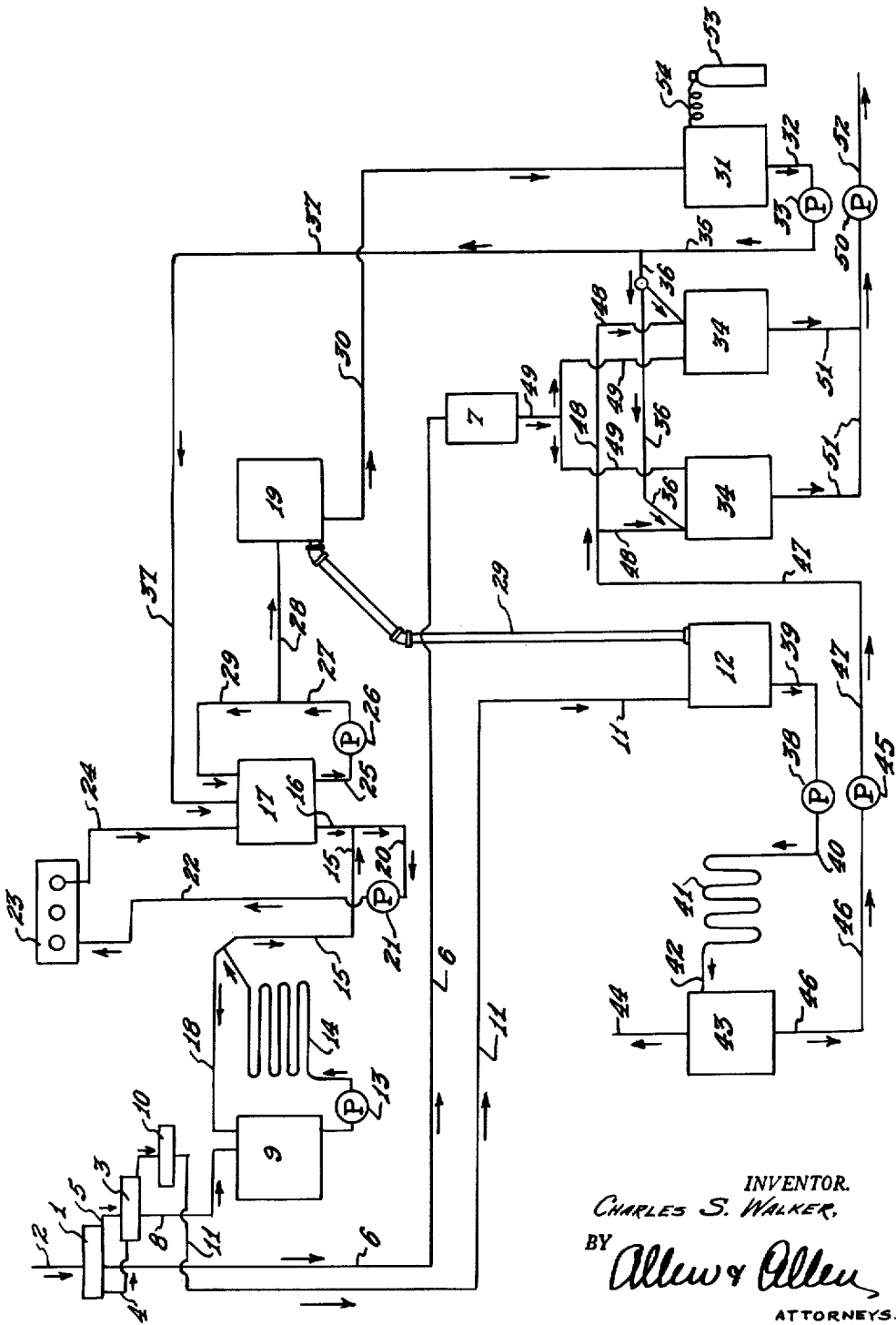

3,156,571
CONTINUOUS PROCESS AND APPARATUS FOR
MAKING CONCENTRATED LIQUIDS
Charles S. Walker, Clearwater, Fla., assignor to Institutum Divi Thomae Foundation, Cincinnati, Ohio, a corporation of Ohio
Filed Feb. 21, 1955, Ser. No. 489,325
12 Claims. (Cl. 99—205)

My invention relates to the manufacture of concentrates of natural fruit or vegetable juices or other beverages.

Concentrated orange juice is an example of such juices and is widely sold in the form of a four-fold concentrate which is sealed in cans and held in frozen storage until sold to the consumer. The consumer dilutes the concentrate three-to-one with water to prepare a product taking the place of natural orange juice for beverage or other purposes.

While orange juice concentrate is an example of the type of product which may be made in accordance with my invention and while the making of such a product will be described herein for the purpose of an exemplary showing of the invention, it should be understood that the utility of my process and apparatus is not confined thereto but is broadly applicable to the manufacture of concentrated beverages such as fruit and vegetable juices in general, including but without limitation tomato juice, pineapple juice, grape juice, grapefruit juice, lemon juice and other liquid substances, such as milk and brewed coffee which present problems similar to those hereinafter outlined for orange juice, and in connection with which economic considerations and convenience warrant the provision of a concentrate. All such juices and liquids are hereinafter referred to by the collective term "juice," for convenience and brevity.

Hitherto in the practical art there have been two main ways practiced for the concentration of orange juice. The expressed juice may have the desired portion of water evaporated from it by heat under reduced pressure. A fundamental disadvantage of this procedure is that the esters and essential oils, which are the flavor-giving components of the natural juice, are, to a very large extent, driven off, so that the product is not comparable to natural juice and is deficient in flavor. These concentrates are in fact so tasteless that where the vacuum-evaporation procedure has been commercially undertaken, it has been the practice to over-concentrate the juice and then dilute it back to the desired Brix value by the addition of unconcentrated fresh juice to impart some natural flavor.

A second procedure, heretofore practiced, involves the freezing of the natural juice. In this procedure the formation of the ice crystals involves a separation of a considerable percentage of the solids in the juice, including the esters and essential oils which are not significantly impaired. The frozen juice is broken up into particles which are then ordinarily subjected to centrifuging. A disadvantage of this procedure, however, lies in the fact that a substantial percentage of the valuable solids in the juices, including sugars, citric acid, vitamin C and the like, are occluded in the ice crystals and resist separation, so that the procedure is essentially inefficient and uneconomical.

In Patent 2,588,337, dated March 11, 1952, George Sperti described a new process for concentrating orange juice which preserved the advantages of freezing concentrate with respect to retention of volatile flavor and elimination of cooked taste, and at the same time eliminated losses of solids in the ice. In general, the process disclosed in the Sperti patent involved first concentrating fresh juice by freezing and separating the resulting concentrate, preferably by centrifuging the frozen juice mass. This concentrate contained a substantial part of the solids of the fresh juice and also practically all of its volatile flavor constituents. The residue ice was then thawed to release occluded pulp, sugars, and other soluble constituents in a liquid solution-suspension which was practically free of volatile flavor constituents. Since the pulp, sugars and other soluble constituents are not heat-labile, this liquor was concentrated by evaporation, preferably under vacuum, without objectionable deterioration of taste and flavor. After most of the water had been removed, the concentrated liquor was returned to and mixed with the concentrated juice so that the resulting mixture contained practically all of the valuable constituents of the crushed juice without material loss or deterioration of volatile flavor.

The process of the Sperti patent is adapted for either batch or continuous operation. Thus, the patent teaches that when a process of the latter type is employed the fresh juice can be passed through a continuous freezer and into a centrifuge in which the concentrate is separated from the ice. The ice can be discharged from the centrifuge, thawed either partially or entirely, and the resulting liquor passed through an evaporating apparatus and back to the centrifuged concentrate.

In accordance with my present invention I have devised an improved method for carrying out the process of the Sperti patent in a continuous manner. I accomplish this by circulating the beverage between a cooler and a holding tank so that the formation of ice crystals takes place in the beverage being processed. The cooling is not carried out to such an extent, however, that the mass of beverage is not in a flowable condition so that it cannot be pumped. While the beverage undergoing cooling is being circulated between the cooler and the holding tank, fresh beverage is introduced into the circulating stream and partially frozen beverage including unfrozen liquid and ice crystals are withdrawn from the circulating stream. The material withdrawn can then be centrifuged conveniently to separate concentrated liquid from solids including ice crystals. The solids can then be thawed, the resulting liquid concentrated by evaporation, and the liquid thus formed admixed with the concentrated liquid from the centrifuge, in accordance with the procedure of the Sperti patent. The circulating procedure of my invention possesses the advantage that when it is employed it is possible to control accurately the formation of ice crystals in the beverage undergoing freezing, so that the separation of solids from concentrated beverage in a centrifuge can be conveniently and effectively accomplished with high productivity.

A principal object of this invention is the provision of a process and apparatus for making low cost liquid concentrates in a controlled, continuous fashion with high productivity.

Another object of the invention is the provision of a process and apparatus whereby, by reason of rapid, continuous processing, a liquid concentrate may be made which is superior in flavor and economy to those hitherto available.

These and other objects of the invention, which will be set forth hereinafter or will be apparent to one skilled in the art upon reading these specifications, I accomplish by that procedure and in that apparatus assembly of which I shall now describe an exemplary embodiment.

The accompanying drawing depicts in diagrammatic form an arrangement of apparatus in which my process can be carried out in the manufacture of orange juice concentrates. In the drawing, the numeral 1 indicates a conventional paddle type pulp cooler into which orange juice from conventional juice extractors is fed by means of line 2. From the cooler 1, the juice passes to a conventional screw type fine juice finisher 3 by means of lines 4 and 5 and pulp of desirable characteristics passes by means of line 6 to pulp tank 7 to be used as hereinafter described. From finisher 3 fine juice containing some finely divided insoluble solids passes by means of line 8 to holding tank 9 for further processing and the remainder of the material fed to finisher 3 is passed to a second screw type juice finisher 10 in which there is produced a relatively low grade of juice. This low grade juice passes by means of line 11 to evaporator feed tank 12, the purpose here being to improve slightly the overall yield of the final product.

From holding tank 9 the juice is pumped by means of pump 13 to pre-chiller 14, from which the juice flows by means of line 15 to an exit line 16 of holding tank 17 or back to holding tank 9 by means of line 18. The purpose of line 18 is to provide a means whereby the juice can be maintained in a cold condition when the holding tank 17 is full to capacity and partially frozen juice is not being fed to the centrifuge 19 hereafter described. From tank 17 the juice is withdrawn by means of lines 16 and 20 and is pumped by means of pump 21 through line 22 to a three tunnel Votator 23, which is a conventional rapid slush freezer. From Votator 23 the juice passes by means of line 24 back to holding tank 17.

For holding tank 17 partially frozen juice is withdrawn by means of line 25 and is pumped by pump 26 into line 27. Line 27 connects with line 28, which is the feed line to a centrifuge 19, and also with line 29, which is used for recirculating when the centrifuge is not being charged. In the centrifuge 19, solids are separated from concentrated liquid, as hereinafter explained.

The initial concentrate derived from the continuous centrifuge must be carefully controlled both as to flavor and as to Brix value, since it is not possible to compensate for wide variation in these matters by a second or vacuum-evaporated concentrate. As a consequence, the material reaching the continuous centrifuge must be quite accurately predetermined as to crystal size and crystal condition, so that a first concentrate of suitable characteristics may be obtained.

A material suitable for centrifuging must, of course, be sufficiently mobile to be handled, as by pumping. It should be frozen to such an extent that when the removable ice has been separated out, a concentrate containing the desired percentage of solids will remain. Putting this another way, if a concentrate is desired containing half as much water as the original liquid, then half of the initial water content must be so frozen as to be removable as ice under the particular centrifuging conditions, and without removal of an undesirable quantity of fine solids.

At the same time, however, the nature of the removable ice crystals must be such as to minimize entrapment, since otherwise an efficient separation will not be had, and some of the flavor-imparting constituents of the original liquid may be lost from the initial concentrate. Undue entrapment can result not only from over-freezing, but also from the nature of the ice crystals produced.

Again, the quantity of removable ice must be susceptible of accurate control so that it can be maintained constant or varied as required, since otherwise a product of constant or adjusted concentration cannot be produced.

In the formation of a partially frozen slurry, it is necessary that the ice be formed as individual crystals which grow slowly. Thus, the crystals must be formed under conditions of constant agitation, and an effectively gradual lowering of temperature. Quick freezing methods, such for example as the mere passage of the juice through a chilled Votator, are not alone suitable for the production of a proper material for centrifuging, since although a mobile slurry may be obtained, the crystals are likely to be relatively coarse and intermeshed, promoting entrapment. Having formed a slurry, it is often advantageous to temper or maintain it under constant temperature for a period of time, since this promotes the individualization of crystals and improves the distribution of crystal sizes.

It is possible by using a long freezing unit in which the material is constantly agitated and in which its temperature is very gradually reduced, to form a proper slurry without recirculation. However, the recirculatory type of operation and apparatus herein described is believed by me to constitute the most effective and economical mode of practicing the invention.

In any slurry in which the crystals are formed, it will be found that the crystals are not all of the same size. Nevertheless, in a slurry in which the crystals have been grown under the proper conditions as herein outlined, or in a slurry which has been properly tampered, the distribution of crystal sizes follows an ascertainable pattern. This makes it possible to adopt a centrifuging procedure which will remove substantially all or a controlled part of the ice crystals present.

The centrifuge may be a basket type dehydrator in which an intermittent operation is performed. The operation is broken down into a feed cycle, a spin cycle and an unload cycle. The speed of the centrifuge and the length of time of feed, spin and unload cycles are set as accurately as possible to obtain a high Brix product on the liquid discharge and as much ice as possible at a relatively low Brix. While the screen size for the basket of the centrifuge is initially important, the actual separation in the centrifuge when used batchwise is secured through the porosity of the filter cake rather than through the perforations of the screens during the greater part of the batch operation. Therefore, the size and condition of ice crystals is important because the ice crystal size, in conjunction with the fine solids which are in admixture with them, regulates the porosity of the filter cake. During most effective operation, ice forming a part of the filter cake continually is melting and passing through the screen.

On the other hand, the centrifuge may be equipped with a continuously acting scraper which removes some or all of the so called filter cake at a given rate as it forms. Such a centrifuge is sometimes termed continuous. Here the sizes of ice crystals which will be removed is more directly a matter of the mesh size of the screen or screens used in connection with the centrifuge; and with a slurry containing graduated crystal sizes, an operation in which a fixed, chosen percentage of the smaller crystals is passed by the centrifuge becomes possible.

For example, in some operations I may employ a screen of such mesh size that it will pass 65% or less of the ice crystals in the slurry as it comes from the crystal-growing assembly. This means that 35% or more of the formed ice will be removed. In a preferred but non-limiting type of operation, I remove from about 35% to about 50% of the formed ice. More may be removed if desired. But with a freezing procedure which consistently converts a fixed quantity of the liquid to properly developed ice crystals of fixed size distribution, and a separation system which consistently removes a fixed quantity of the ice crystals, it is readily possible to produce from uniform raw liquid an initial concentrate of fixed solids content and holding substantially all of the flavor-imparting ingredients of the raw liquid.

Ordinarily, the screen mesh sizes which I may employ to best advantage are 16 x 16 to 40 x 40 mesh.

Moreover, whether the centrifuging is batch-wise or continuous, the system is under control at all times. If the initial concentrate is too dilute, i.e., contains too much water, it is readily possible to vary the conditions under which the crystals are grown so that the average crystal size becomes larger. Thus, more of the ice will be retained. The converse may also be practiced. The essential controls will normally be temperature and time, the latter being a matter of the percentage recirculation in the described apparatus embodiment.

The separated ice from the centrifuge passes by means of line 29 to evaporator 12, while the liquid concentrate passes by means of line 30 to tank 31, from which liquid is withdrawn by means of line 32 and pumped by pump 33 to blend tanks 34 by means of lines 35 and 36, or back to the holding tank 17 by means of lines 35 and 37. Line 37 is provided to enable further concentration of liquid by recirculation through the system. This is advantageously done intermittently since, in addition to effecting further concentration, recycling removes the majority of the finely divided pump solids in this portion of the juice. This reduction in finely divided solids is advantageous since it has been found that some pectin esterase activity of the juice is directly related to the finely divided solids. Moreover, the increase in Brix caused by recirculating through line 37 decreases the size of the ice particles formed in tank 17, thereby providing a finer crystal to form the filter cake in the centrifuge and increasing the ability of the centrifuge to keep the finely divided solids in the ice phase of the process.

The relatively low grade juice passing through line 11 and the ice passing through line 29 are admixed in evaporator feed tank 12, and thence are pumped by means of pump 38 through lines 39 and 40 to pasteurizer 41, from which liquid passes by means of line 42 into evaporator 43. Water vapor removed in evaporator 43 passes from the system by line 44 and the concentrated liquid produced in evaporator 43 is pumped by pump 45 through lines 46 and 47 and 48 into blend tanks 34. Pulp from tank 7 is also introduced into blend tanks 34 by means of lines 49. From blend tanks 34 the final concentrated product is pumped by means of pump 50 through lines 51 and 52 to the canning operation. A tank of nitrogen 53 may be connected by means of line 54 to tank 31 to provide an atmosphere of nitrogen over the liquid contained therein.

In a typical operation, the orange juice in holding tank 9 has a Brix value of about 13° and is maintained at a temperature of about 31° F. Under these conditions the juice passes through line 15 at a rate of about 25 gallons per minute. Pump 21 operates at a flow of about 50 gallons per minute, and upon leaving Votator 23 the juice is at a temperature of about 27° F. Holding tank 17 has a capacity of about 300 gallons. The centrifuge 19 may be operated batch-wise with a filter cake about ⅜ inch thick to provide an ice phase having a Brix value of about 10.2° when melted and a liquid phase having a Brix value of about 28°. In the pasteurizer 41, the ice phase in admixture with low grade juice is heated to a temperature of about 170–175° F. and the evaporation in evaporator 43 is carried out at a temperature of about 70° F. Evaporation in evaporator 43 is preferably carried out to such an extent that when the product produced therein, the pulp from pulp tank 7 and the liquid from tank 31 are admixed in blending tanks 34 the final product passing through line 52 has a Brix value of about 42°. When operating in the manner just described, for each 100 gallons of fresh orange juice having a Brix value of 13° and containing 113.9 pounds of total sugars, 97.63 gallons of juice having a Brix value of 13° and containing 111.2 pounds of sugars pass through line 8 into holding tank 9 and 2.37 gallons of juice having a Brix value of 13° and containing 2.6 pounds of sugars pass through line 11 into evaporator feed tank 12. When melted, the ice passing through line 16 will amount to 82.98 gallons having a Brix value of 10.2° and containing 73.0 pounds of sugars and the liquid passing through line 30 will amount to 14.65 gallons having a Brix value of 28° and containing 38.2 pounds of sugars. The material contained in evaporator feed tank 12 will amount to 85.35 gallons having a Brix value of 10.8° and containing 75.6 pounds of sugars. Upon evaporation in evaporator 43, the material passing through line 46 will amount to 12.75 gallons having a Brix value of 56.2° and containing 75.6 pounds of sugars. The final concentrate passing through line 51 amounts to 27.4 gallons having a Brix value of 43° and containing 113.9 pounds of sugars.

There are various materials for concentration with respect to which the application of greater than normal temperatures would impart undesirable flavor characteristics. For example, a wholesome milk concentrate of excellent flavor can be formed by treating homogenized milk as set forth above, discarding the separated ice mass, and suitably treating the initial concentrate, as by continuous pasteurization followed by filling the concentrate into bottles, cans, or other containers. The flavor characteristics imparted by the application of heat to milk constituents will thus be avoided. Similarly, a liquid coffee concentrate can be made from brewed coffee as the initial concentrate produced as set forth above. The coffee will thus not be subject to the loss of essential oils due to the application of heat. When treating orange juice or other fruit juices, the initial concentrate is a wholesome material of full flavor which can be used as such. It is within the spirit of my invention to subject an initial concentrate formed as set forth above to a repetition of the hereinbefore outlined steps one or more times if it is desired to decrease further the proportion of water in the concentrate.

Modifications may be made in the invention without departing from the spirit of it. Various arrangements of continuous freezers and holding or cold wall tanks including recirculatory systems may be employed to control the crystal growth and distribution. The feeding of the various parts of the apparatus may be controlled by metering pumps, metering valves and the like.

Having described the invention in an exemplary embodiment what I claim as new and desire to secure by Letters Patent is:

1. In a process of making concentrates from aqueous liquid beverage material chosen from a class consisting of fruit and vegetable juices, milk and brewed coffee, the steps of continuously circulating the beverage material between a cooler acting to cool portions of said beverage material to the extent of producing ice crystals therein and a holding tank, in a closed system, whereby the formation of ice crystals in the beverage material takes place while the beverage material is maintained in a flowable condition, continuously introducing fresh beverage material into the circulating stream and continuously withdrawing partially frozen beverage material from the circulating stream, and subjecting the withdrawn material to centrifugal separation whereby to remove from it at least a portion of the ice crystals formed therein.

2. In a process of making concentrates from aqueous liquid beverages materials chosen from a class consisting of fruit and vegetable juices, milk and brewed coffee, the steps of continuously partially freezing the beverage material in a recirculatory system so as to form a mobile slurry of ice crystals of fixed size distribution suspended in a liquid component, and separating from said slurry continuously a substantially constant quantity in excess of about 35% but less than all of the said ice crystals whereby to form from the remaining material a controlled concentrate of reduced liquid content and containing a controlled quantity of the initial solids in said beverage material.

3. A process according to claim 1 in which the beverage material is citrus juice.

4. A process according to claim 1 in which the partially frozen beverage material withdrawn is separated into a liquid fraction and a solids fraction and in which liquid fraction is recirculated to the holding tank.

5. A process according to claim 4 in which the beverage material is citrus juice.

6. The process claimed in claim 2 wherein the said separation is accomplished by centrifugal means including a screen having a fixed mesh size and in which the relative quantities of the ice crystals passed by and retained upon said screen is determined and controlled by controlling the growth of ice crystals in the formation of said slurry, the said last mentioned control being exercised by forming the slurry under conditions of continuous agitation and gradual effective lowering of temperature and by varying the length of time of subjection of any increment of the said liquid to the said conditions.

7. In a process of making liquid concentrates continuously from aqueous beverage liquids, the steps of continuously recirculating a concentratable liquid product between a continuous cooler and a refrigerated holding tank in a recirculatory system while causing the production of ice crystals in the material in said system by freezing, maintaining the said material in a pumpable condition by said recirculation, introducing into the said system increments of fresh liquid, withdrawing from said system at another point increments of treated material, and delivering the last mentioned increments to a separator whereby to effect the separation of some at least of said ice crystals.

8. A process of producing a concentrate which comprises providing a closed recirculatory system including a refrigerated tank and a continuous cooler and maintaining in said system a concentratable aqueous beverage liquid in a state of continuous recirculation while producing ice crystals in said product by freezing whereby a pumpable character of the treated product is maintained, feeding measured increments of fresh liquid into said system, and withdrawing comparable increments of treated material therefrom and delivering them to a centrifugal separator to separate some at least of the ice crystals therefrom, while controlling the size and characteristics of the ice crystals in said treated material by controlling the length of time the said material remains in said recirculatory system to the end of producing by means of said centrifugal separator an initial concentrate rich in flavor characteristics, low in water, and containing a controlled quantity of the solids of said liquid.

9. A process of producing a concentrate which comprises providing a closed recirculatory system including a refrigerated tank and a continuous cooler and maintaining in said system a concentratable aqueous beverage liquid in a state of continuous recirculation while producing ice crystals in said liquid by freezing whereby a pumpable character of the treated product is maintained, feeding measured increments of fresh liquid into said system, and withdrawing comparable increments of treated material therefrom and delivering them to a centrifugal separator to separate some at least of the ice crystals therefrom, while controlling the size and characteristics of the ice crystals in said treated material by controlling the length of time the said material remains in said recirculatory system to the end of producing by means of said centrifugal separator an initial concentrate rich in flavor charactertistics, low in water, and containing a controlled quantity of the solids of said liquid, withdrawing the separated ice crystals and subjecting the withdrawn material to evaporation to produce a second concentrate, and blending the first and second concentrates.

10. In apparatus for the purpose described, a reservoir for liquid to be concentrated, a holding tank fed by said reservoir, means for gradually cooling said liquid to a temperature at which ice crystals form therein, said holding tank and cooling means having interconnections forming a recirculatory system, means for maintaining said liquid under conditions of continuous agitation in said recirculatory system during the formation of said crystals, means for varying the length of time of submission of any increment of said liquid to said cooling and agitating in said system, whereby to vary the size and size distribution of the crystals forming in said liquid, means for withdrawing treated liquid from said recirculatory system, and separating means acting to separate from said treated liquid crystals above a certain size therein.

11. In apparatus for the purpose described, a reservoir for liquid to be concentrated, a recirculatory system including a refrigerated tank and a continuous cooler, means in said recirculatory system to enforce continuous and rapid circulation of material therein while ice crystals are being formed in said material, means for feeding increments of liquid into said recirculatory system from said reservoir, and means for withdrawing from said recirculatory system at another point comparable increments of treated material and for delivering said last mentioned increments to a centrifuge.

12. In combination for the purpose described, a reservoir for concentratable liquid, a recirculatory system including a refrigerated tank, a continuous cooler, and a means for enforcing recirculation therebetween, a connection between said reservoir and said recirculatory system including a metering device, a centrifuge, and a connection between said recirculatory system and said centrifuge including a metering device, a receiver for an initial liquid concentrate from said centrifuge, an evaporator for producing a second concentrate, means for delivering sludge from said centrifuge to said evaporator, and means for combining and blending said first and second concentrates.

References Cited in the file of this patent

UNITED STATES PATENTS

| 2,436,218 | Malcolm | Feb. 17, 1948 |
|---|---|---|
| 2,503,695 | Webb et al. | Apr. 11, 1950 |
| 2,588,337 | Sperti | Mar. 11, 1952 |
| 2,657,555 | Wenzelberger | Nov. 3, 1953 |
| 2,685,783 | Benscheidt et al. | Aug. 10, 1954 |